United States Patent
Chen

(10) Patent No.: US 9,718,736 B2
(45) Date of Patent: Aug. 1, 2017

(54) SINTERING PROCESS FOR CERAMIC SHEETS

(71) Applicant: FUJIAN JIAMEI GROUP CORPORATION, Quanzhou (CN)

(72) Inventor: Zhihan Chen, Quanzhou (CN)

(73) Assignee: FUJIAN JIAMEI GROUP CORPORATION, Quanzhou (CN)

( * ) Notice: Subject to any disclaimer, the term of this patent is extended or adjusted under 35 U.S.C. 154(b) by 0 days.

(21) Appl. No.: 15/025,556

(22) PCT Filed: Sep. 15, 2014

(86) PCT No.: PCT/CN2014/086507
§ 371 (c)(1),
(2) Date: Mar. 29, 2016

(87) PCT Pub. No.: WO2015/043388
PCT Pub. Date: Apr. 2, 2015

(65) Prior Publication Data
US 2016/0207839 A1    Jul. 21, 2016

(30) Foreign Application Priority Data
Sep. 29, 2013  (CN) .......................... 2013 1 0453497

(51) Int. Cl.
C04B 35/64 (2006.01)
B28B 1/24 (2006.01)
C04B 33/34 (2006.01)
B28B 11/24 (2006.01)

(52) U.S. Cl.
CPC .............. *C04B 35/64* (2013.01); *B28B 1/24* (2013.01); *B28B 11/243* (2013.01); *C04B 33/34* (2013.01); *C04B 2235/656* (2013.01); *C04B 2235/6562* (2013.01); *C04B 2235/6565* (2013.01)

(58) Field of Classification Search
CPC  C04B 33/34; C04B 35/64; B28B 1/24; B28B 11/243

USPC ................ 264/600, 603, 605, 653, 657, 666
See application file for complete search history.

(56) References Cited

U.S. PATENT DOCUMENTS

2005/0255983 A1* 11/2005 Becker .................... C03B 32/02
501/4

FOREIGN PATENT DOCUMENTS

| CN | 1298846 A | 6/2001 |
|----|-----------|--------|
| CN | 102190507 A | 9/2011 |
| CN | 102249739 A | 11/2011 |
| CN | 102363578 A | 2/2012 |
| CN | 103121833 A | 5/2013 |
| CN | 103467107 A | 12/2013 |

OTHER PUBLICATIONS

Rahaman, M. N. Ceramic Processing and Sintering. New York: M. Dekker, 1995. pp. 688-703.*
Machine translation of CN 103121833.*
Lingke Zeng et al"Firing Technology for Large-sized Ultrathin Ceramic Boards" China Ceramic Industry,Feb. 2013, vol. 20,No. 1, pp. 32-35.

* cited by examiner

*Primary Examiner* — Nahida Sultana
(74) *Attorney, Agent, or Firm* — Gokalp Bayramoglu

(57) ABSTRACT

Disclosed is a sintering process for ceramic sheets. After biscuit firing and glazing, a green body is placed in a kiln, wherein the temperature of the kiln is controlled such that: when the kiln temperature is 100-400° C., the temperature rise duration is 1-2 hours when the kiln temperature is 400-900° C., the temperature rise duration is 2-3 hours; when the kiln temperature is 900-1100° C., the temperature rise duration must reach 3 hours or more; when the kiln temperature is 1100-1350° C. the temperature rise duration is controlled to be 3-4 hours; and after the temperature reaches 1350° C., heat-preservation cooling is conducted; when the temperature drops to 1230-1270° C., the temperature is raised again to 1290-1310° C.; when the temperature drops again to 880-920° C., the kiln cover is opened for cooling, and the finished product is taken out.

5 Claims, No Drawings

SINTERING PROCESS FOR CERAMIC SHEETS

TECHNICAL FIELD OF THE INVENTION

This invention relates to a ceramic sintering process, in particular to a sintering process for ceramic sheets.

BACKGROUND

Sintering is one of the most important processes in ceramic production. During the sintering process, green body always goes through dehydration, organics volatilization, burning, carbonate decomposition, mineral formation, densification, microstructure formation and other chemical and physical changes. Because of the thinness of the ceramic sheet, the series of changes in the sintering process may cause cracks on the ceramic sheet or even break the ceramic sheet. In the existing sintering process of ceramic sheets, the improper control of sintering temperature may cause inhomogeneity densification and consequently break the ceramic sheet. The qualified rate is very low and rejection rate is high, which increases the cost of production. The thickness of the ceramic sheet is also limited. Furthermore, with respect to ceramic sheets with uneven thickness, the qualified rate is even lower.

SUMMARY OF THE INVENTION

Technical Problem

This invention provides a sintering process for ceramic sheet, to overcome fragility, low qualified rate and high cost in the existing technology.

Technical Solution

This invention uses the technical solution as below:
a sintering process for ceramic sheets, putting a green body after biscuit firing and glazing into a kiln, the temperature control of the kiln comprises the following steps in sequence;
a. heating up slowly when the temperature of the kiln ranges from 100 to 400° C., the temperature rise duration ranges from 1 to 2 hours;
b. heating up rapidly when the temperature of the kiln ranges from 400 to 900° C., the temperature rise duration ranges from 2 to 3 hours;
c. heating up very slowly when the temperature of the kiln ranges from 900 to 1100° C., the temperature rise duration should be longer than 3 hours;
d. when the temperature of the kiln ranges from 1100 to 1350° C., controlling the temperature rise duration ranges from 3 to 4 hours;
e. when the temperature of the kiln reaches 1350° C., cooling with a very slow cooling rate;
f. when the temperature of the kiln falls to 1230 to 1270° C., raising the temperature to 1290 to 1310° C.;
g. opening the kiln and taking the final product out of the kiln after cooling down to the range of 880 to 920° C.

Furthermore,
The thickness of the ceramic sheet is less than 5.1 mm. Furthermore, the thickness of the ceramic sheet ranges from 1.0 to 4.0 mm.

The ceramic sheet comprises an inner surface and an outer surface. The outer surface is bumpy and forms a regular pattern. Further, the regular pattern is a figure painting or a landscape painting.

The green body is put into a mould. A method of making the green body is as below: painting on the mould with a reagent used for demoulding, and injecting slurry to a preset thickness; after the slurry is completely dried naturally to form a white body, putting the white body into the kiln for biscuit firing; glazing with a transport glaze after biscuit firing. Furthermore, the reagent is a water reducing agent, the slurry is made of a petuntze with the fineness greater than 280 mesh and an adhesive compound with weight percentage ranging from 1.0% to 4.0 wt %, the water percentage of the slurry is not more than 30%. The white body can only be slightly modified before hardening and drying. After being completely dried, any modification or water touching is forbidden.

Furthermore, the biscuit firing temperature is 1000° C.

Beneficial Effect

By the description for the invention stated above, and comparing to the existing technology, the present invention has following advantages: the sintering process can not only increase the success rate of ceramic sheet sintering, but also achieve a ceramic sheet with a smooth, bright and clear glaze surface. The size of the sintered ceramic sheet is at least 1.5×1.5 m; furthermore, the sintering process of the invention can create ceramic sheets with very small thickness and high transparency. The thickness of the ceramic sheet is as below: the thickness of the thinnest concave pan is not more than 1 mm, the thickness of the convex part is not more than 3 mm. In addition, a light source may be set on the ceramic sheet, consequently a three-dimensional effect of shadow carving with soft, bright and transparent effects is achieved. Preferably, the light source emits warm light.

DETAILED DESCRIPTION OF THE INVENTION

Best Embodiment

A sintering process for ceramic sheets, firstly, painting, on the mould with the water reducing agent [Water reducing agent is a novel and efficient electrolyte used for ceramic. The electrolyte will not hurt the parget mould, will improve the demoudling efficiency, and increase grouting times. Beating is easier with good fluidity; qualified rate is increased, and the body can stay in the mould for 24 h without cracking. The water reducing agent is a colorless and transparent liquid, being odorless, non-poisonous and soapy. The specific gravity (25° C.) is 1.16, the Val max is 75 Pa·s. The water reducing, agent is easily dissolved in water]; injecting slurry into the mould until reaching a preset thickness. After the slurry is completely dried naturally to form a white body, putting the white body into the kiln for biscuit firing, wherein the temperature of biscuit firing is 1000° C.; after biscuit firing, glazing with a transport glaze. The slurry is made of petuntze with the fineness greater than 280 mesh and 3.0 wt % adhesive, the water percentage of the slurry is not more than 30%. The white body can only be slightly modified before hardening and drying. After being completely dried, any modification or water touching is forbidden. At last, putting the glazed green body into the kiln, wherein the temperature of the kiln is controlled by the following steps in sequence:
a. heating up slowly when the temperature of the kiln ranges from 100 to 400° C., the temperature rise duration is 2 hours;

b. heating up rapidly when the temperature of the kiln ranges from 400 to 900° C., the temperature rise duration is 2 hours;
c. heating up very slowly when the temperature of the kiln ranges from 900 to 1100° C., the preferable temperature rise duration is 5 hours;
d. when the temperature of the kiln ranges from 1100 to 1350° C., controlling the temperature rise duration to be 3.5 hours;
e. when the temperature of the kiln reaches 1350° C., cooling with a very slow cooling rate;
f. when the temperature of the kiln falls to 1250° C., raising the temperature to 1300° C.;
g. opening the kiln and taking the product out of the kiln after re-cooling the kiln down to 900° C.

The ceramic sheet comprises an inner surface and an outer surface, the outer surface is bumpy to form a figure painting or a landscape painting. The figure painting or the landscape painting can spread to the whole outer surface of the ceramic sheet, or be set at the center of the outer surface. The part outside of the figure painting or the landscape painting is an exterior. The exterior is configured to support and decorate. The thickness of the exterior preferably ranges from 3.0 to 5.0 mm. Preferably, the thickness is 4.0 mm. The thickness of painting preferably ranges from 1.0 to 3.0 mm, the thickness of the thinnest concave part is not more than 1 mm, the thickness of the convex part is not more than 3 mm.

Embodiment 1

A sintering process for ceramic sheets, firstly, painting on the mould with the water reducing agent, and injecting slurry into the mould until reaching a preset thickness. After the slurry is completely dried naturally to form a white body, putting the white body into the kiln for biscuit firing, wherein the temperature of biscuit firing is 1000° C. After biscuit firing, glazing with a transport glaze is conducted. The slurry is made of petuntze with the fineness greater than 280 mesh and 4.0 wt % adhesive, wherein the water percentage of the slurry is not more than 30%. The white body can only be slightly modified before hardening and drying. After being completely dried, any modification or water touching is forbidden. At last, putting the glazed green body into the kiln, wherein the temperature of the kiln is controlled by the following steps in sequence:
a. heating up slowly when the temperature of the kiln ranges from 100 to 400° C., the temperature rise duration is 1.5 hours;
b. heating up rapidly when the temperature of the kiln ranges from 400 to 900° C., the temperature rise duration is 2.5 hours;
c. heating up very slowly when the temperature of the kiln ranges from 900 to 1100° C., the temperature rise duration is 3 hours;
d. when the temperature of the kiln ranges from 1100 to 1350° C., controlling the temperature rise duration to be 3 hours;
e. when the temperature of the kiln reaches 1350° C., cooling with a very slow cooling rate;
f. when the temperature of the kiln falls to 1270° C., raising the temperature to 1310° C.;
g. opening the kiln and taking the product out of the kiln after re-cooling the kiln down to 920° C.

The thickness of the exterior of the ceramic sheet is 3.0 mm. With respect to the thickness of painting, the thickness of the thinnest concave part is not, more than 1 mm, the thickness of the convex part is not more than 3 mm.

Embodiment 2

A sintering process for ceramic sheets, firstly, painting on the mould with the water reducing agent, and injecting slurry into the mould until reaching a preset thickness. After the slurry is completely dried naturally to form a white body, putting the white body into the kiln for biscuit firing, wherein the temperature of biscuit firing is 1000° C.; after biscuit firing, glazing with a. transport glaze. The slurry is made of petuntze with the fineness greater than 280 mesh and 1.0 wt % adhesive, the water percentage of the slurry is not more than 30%. The white body can only be slightly modified before hardening and drying. After being completely dried, any modification or water touching is forbidden. At last, putting the glazed green body into the kiln, wherein the temperature of the kiln is controlled by the following steps in sequence:
a. heating up slowly when the temperature of the kiln ranges from 100 to 400° C., wherein the temperature rise duration is 1 hour;
b. heating up rapidly when the temperature of the kiln ranges from 400 to 900° C., wherein the temperature rise duration is 3 hours;
c. heating up very slowly when the temperature of the kiln ranges from 900 to 1100° C., the temperature rise duration is 3 hours,
d. when the temperature of the kiln ranges from 1100 to 1350° C., controlling the temperature rise duration to be 4 hours;
e. when the temperature of the kiln reaches 1350° C., cooling with a very slow cooling rate;
f. when the temperature of the kiln falls to 1230° C., raising the temperature to 1290° C.;
g. opening the kiln and taking the product out of the kiln after re-cooling the kiln down to 880° C.

The thickness of the exterior of the ceramic sheet is 5.0 mm. With respect to the thickness of painting, the thickness of the thinnest concave part is not more than 1 mm, the thickness of the convex part is not more than 3 mm.

INDUSTRIAL APPLICABILITY

The sintering process provided by the present invention can not only increase success rate of ceramic sheet sintering, but also achieve a ceramic sheet with a smooth, bright, and clear glaze surface. The size of the sintered ceramic sheet is at least 1.5×1.5 m, which has a good industrial applicability.

The invention claimed is:
1. A sintering process for ceramic sheets, consists of the following steps in sequence:
   a) painting on a mould with a water reducing agent used for demoulding;
   b) injecting a slurry into the mould to a preset thickness, wherein the slurry is made of petuntze with a particle size smaller than 280 mesh and an adhesive compound with a weight percentage ranging from 1.0% to 4.0%, and a water percentage of the slurry is not more than 30%;
   c) naturally and completely drying the slurry to form a white body;
   d) putting the white body into a kiln for biscuit firing, wherein a temperature of the biscuit firing is 1000° C.;
   e) glazing the white body with a transport glaze to form a green body;

f) wherein the step of putting the green body into the kiln, there exist a temperature control of the kiln which consists of the following steps in sequence:

g) heating up when a temperature of the kiln ranges from 100 to 400° C., the temperature rise duration ranges from 1 to 2 hours;

h) heating up when the temperature of the kiln ranges from 400 to 900° C., the temperature rise duration ranges from 2 to 3 hours;

i) heating up when the temperature of the kiln ranges from 900 to 1100° C., the temperature rise duration is longer than 3 hours;

j) when the temperature of the kiln ranges from 1100 to 1350° C., controlling the temperature rise duration ranges from 3 to 4 hours;

k) when the temperature of the kiln reaches 1350° C., conducting a heat-preservation cooling;

l) when the temperature of the kiln falls to 1230 to 1270° C., raising the temperature to 1290 to 1310° C.;

m) opening the kiln and taking the product out of the kiln after re-cooling the kiln down to the range from 880 to 920° C.

2. The sintering process of claim 1, wherein a thickness of the ceramic sheet is less than 5.1 mm.

3. The sintering process of claim 2, wherein the thickness of the ceramic sheet ranges from 1.0 to 3.0 mm.

4. The sintering process of claim 1, wherein an outer surface of the ceramic sheet is bumpy and forms a regular pattern.

5. The sintering process of claim 4, wherein the regular pattern is a figure painting or a landscape painting.

* * * * *